United States Patent
Li et al.

(10) Patent No.: US 11,822,033 B2
(45) Date of Patent: Nov. 21, 2023

(54) RADIOMETRIC MODELING FOR OPTICAL IDENTIFICATION OF SAMPLE MATERIALS

(71) Applicant: Halliburton Energy Services, Inc., Houston, TX (US)

(72) Inventors: Jian Li, Bellaire, TX (US); Christopher Michael Jones, Katy, TX (US); James Martin Price, Cypress, TX (US); Bin Dai, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 580 days.

(21) Appl. No.: 16/715,835

(22) Filed: Dec. 16, 2019

(65) Prior Publication Data

US 2021/0181028 A1 Jun. 17, 2021

(51) Int. Cl.
*G01V 13/00* (2006.01)
(52) U.S. Cl.
CPC ................... *G01V 13/00* (2013.01)
(58) Field of Classification Search
CPC ......... G01V 13/00; G01J 3/0205; G01J 3/10; G01J 3/28
See application file for complete search history.

(56) References Cited

U.S. PATENT DOCUMENTS

| | | | |
|---|---|---|---|
| 3,598,492 A | 8/1971 | Fruengel | |
| 4,329,023 A | 5/1982 | Harrison et al. | |
| 4,379,233 A * | 4/1983 | Rosenthal | G01N 21/255 250/553 |
| 5,046,846 A | 9/1991 | Ray et al. | |

(Continued)

FOREIGN PATENT DOCUMENTS

| | | |
|---|---|---|
| TW | 201525427 A | 7/2015 |
| WO | 2015134036 A1 | 9/2015 |

(Continued)

OTHER PUBLICATIONS

U.S. Appl. No. 16/595,591, Non-Final Office Action, dated May 5, 2021, 17 pages.

(Continued)

*Primary Examiner* — Alessandro V Amari
*Assistant Examiner* — Michael J Singletary
(74) *Attorney, Agent, or Firm* — DELIZIO, PEACOCK, LEWIN, & GUERRA

(57) ABSTRACT

Methods and systems for implementing and utilizing radiometric characterization in combination with reference material characterization of an optical sensor to more accurately and efficiently measure material properties are disclosed. In some embodiments, a method for for optically measuring material properties includes an optical sensor being radiometrically characterized based on measured optical responses. A model is generated and includes model components of the optical sensor. A parameterized model is generated by fitting n variable parameters of the model components using the optical responses. The optical sensor is utilized to measure an optical response to a reference material and a re-parameterized model is generated by re-fitting m of the n variable parameters of the model components based, at least in part, on the measured optical response to the reference material, wherein m is less than n.

20 Claims, 8 Drawing Sheets

(56) References Cited

U.S. PATENT DOCUMENTS

| | | | |
|---|---|---|---|
| 5,166,747 A * | 11/1992 | Schroeder | G01N 21/8507 |
| | | | 250/343 |
| 5,371,358 A | 12/1994 | Chang et al. | |
| 5,557,398 A | 9/1996 | Wechsler et al. | |
| 5,835,267 A | 11/1998 | Mason et al. | |
| 6,542,241 B1 | 4/2003 | Thorwirth et al. | |
| 6,975,403 B2 | 12/2005 | Navarro Herrero et al. | |
| 8,476,574 B1 | 7/2013 | Brown | |
| 9,091,151 B2 * | 7/2015 | Jones | E21B 47/113 |
| 9,778,103 B1 | 10/2017 | May et al. | |
| 9,971,041 B1 * | 5/2018 | Odom | G01T 1/2008 |
| 10,466,392 B1 | 11/2019 | Melcher et al. | |
| 2002/0191177 A1 | 12/2002 | Ulrich et al. | |
| 2007/0097371 A1 | 5/2007 | Parker | |
| 2008/0030729 A1 | 2/2008 | DiFoggio | |
| 2009/0210168 A1 * | 8/2009 | Vincelette | G01N 21/774 |
| | | | 385/12 |
| 2009/0310087 A1 | 12/2009 | Itoh et al. | |
| 2012/0099109 A1 | 4/2012 | Liu et al. | |
| 2014/0028985 A1 | 1/2014 | Janssens | |
| 2016/0011342 A1 | 1/2016 | Griffin | |
| 2016/0327684 A1 * | 11/2016 | Chen | E21B 47/113 |
| 2017/0261640 A1 | 9/2017 | Chen et al. | |
| 2017/0363905 A1 | 12/2017 | Katsuta et al. | |
| 2018/0284591 A1 | 10/2018 | Kusama et al. | |
| 2019/0187341 A1 | 6/2019 | Chakmakjian et al. | |
| 2019/0285247 A1 | 9/2019 | Usseglio Nanot et al. | |
| 2021/0102893 A1 | 4/2021 | Li et al. | |

FOREIGN PATENT DOCUMENTS

| | | |
|---|---|---|
| WO | 2019221731 A1 | 11/2019 |
| WO | 2021071474 A1 | 4/2021 |
| WO | 2021126160 A1 | 6/2021 |

OTHER PUBLICATIONS

U.S. Appl. No. 16/595,591 Non-Final Office Action, dated Jan. 25, 2022, 18 pages.

PCT Application Serial No. PCT/US2019/055207, International Search Report, dated Jul. 6, 2020, 3 pages.

PCT Application Serial No. PCT/US2019/055207, International Written Opinion, dated Jul. 6, 2020, 8 pages.

PCT Application Serial No. PCT/US2019/066650, International Search Report, dated Sep. 11, 2020, 10 pages.

PCT Application Serial No. PCT/US2019/066650, International Written Opinion, dated Sep. 11, 2020, 5 pages.

U.S. Appl. No. 16/595,591, Final Office Action, dated Oct. 18, 2021, 18 pages.

U.S. Appl. No. 16/595,591, Advisory Action, dated Dec. 8, 2021, 3 pages.

"PCT Application No. PCT/US2019/055207, International Preliminary Report on Patentability", dated Apr. 21, 2022, 10 pages.

"PCT Application No. PCT/US2019/066650, International Preliminary Report on Patentability", dated Jun. 30, 2022, 7 pages.

"U.S. Appl. No. 16/595,591, Final Office Action", dated May 2, 2022, 18 pages.

* cited by examiner

RADIOMETRIC MODELING FOR OPTICAL IDENTIFICATION OF SAMPLE MATERIALS

TECHNICAL FIELD

The disclosure generally relates to the field of optical analysis of materials and more particularly to techniques and structures for implementing and using radiometrically characterized optical modeling.

BACKGROUND

Real-time estimation of material compositions and properties using downhole optical sensing tools is utilized for well testing and sampling in the oil and gas industry. For petroleum exploration, extraction, and processing applications, optical sensors may be utilized in situ (underground or otherwise in the field) to identify various materials including fluid components within oil or gas samples. To improve accuracy of in-situ sample material analysis, radiometry testing is utilized to characterize optical sensors and individual components within the sensors prior to field deployment. The radiometric characterization is utilized to calibrate the sensors and sensor output data processing tools such as sensor output modeling tools. Such radiometric characterization typically requires a controlled environment in which reference characterizations are determined using specialized equipment including reference components and optical diffusers.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without one or more of these specific details. In other instances, well-known instruction instances, protocols, structures and techniques have not been shown in detail in order not to obfuscate the description.

Overview

Disclosed embodiments include methods and systems for radiometrically characterizing optical sensors for downhole optical fluid analysis. In some embodiments, the characterization of optical sensors using either transmissive or reflective light diffusion is utilized to accurately and comprehensively correct optical sensor responses during fluid analysis. Embodiments further include methods and systems for defining models for optical sensors and utilizing the radiometric characterizations to parameterize the model based on radiometric optical responses. The parameters determined to be variable parameters of optical system components such as light source parameters are fitted to the optical responses. The characterized optical sensors are field deployed to measure optical properties of downhole material samples such as fluid samples. The parameterized models may be utilized to process optical sensor output data to more accurately determine properties of downhole material samples.

Disclosed embodiments include a field re-characterization system that includes operations and components for re-fitting a model using one or more reference material responses from the optical sensor. For example, the field deployed optical sensor having a sample cell may generate an optical response to a sample material such as a sample fluid within the sample cell. The response is measured and utilized to generate a re-parameterized model by refitting a subset of the parameters of the optical sensor that were used to parameterize the model using the radiometric responses.

Example Illustrations

Figure 1:
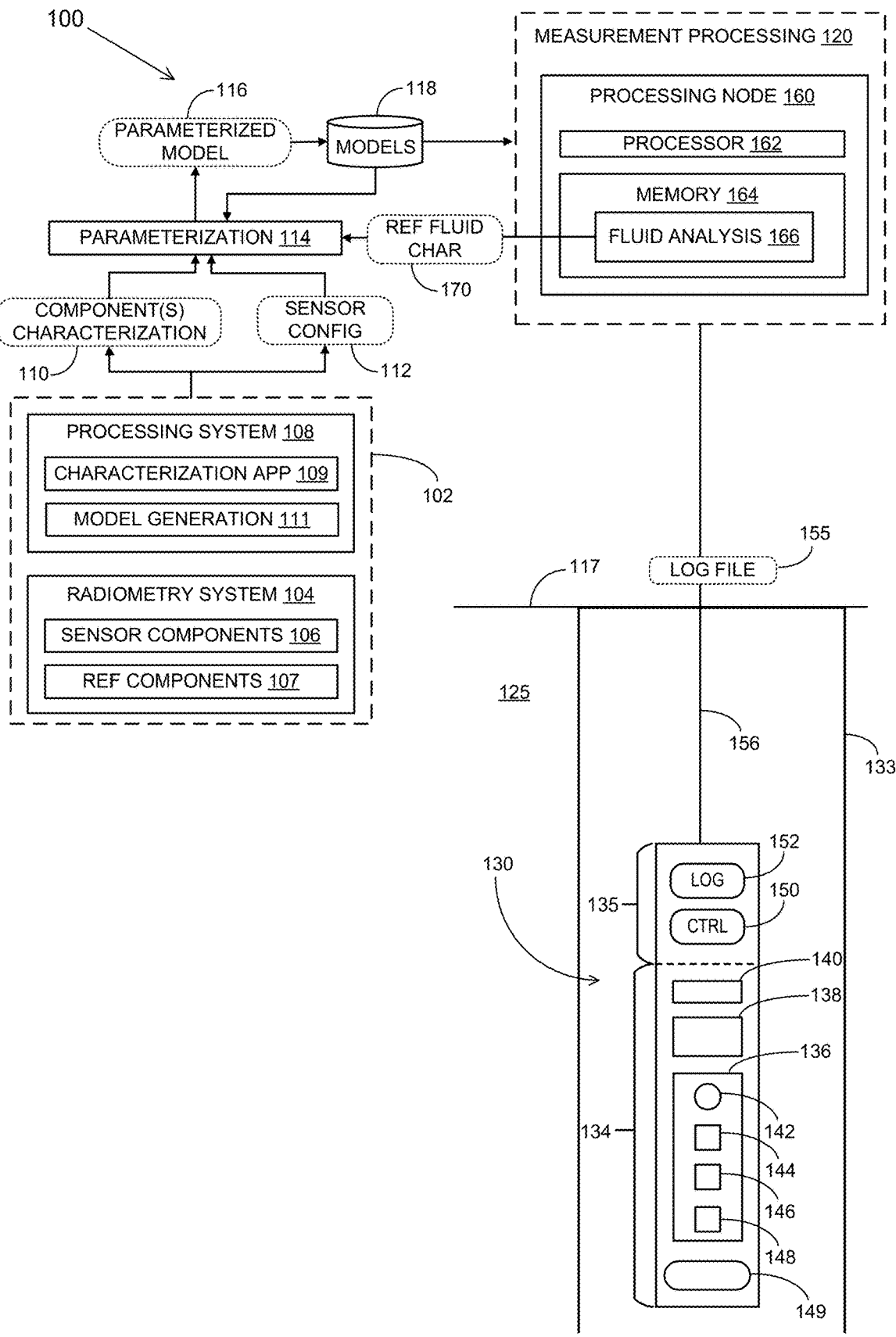
FIG. 1 is a block diagram depicting a system for optically determining material properties in accordance with some embodiments.

FIG. 1 is a block diagram depicting a system 100 for optically determining material properties in accordance with some embodiments. System 100 includes a radiometric characterization system 102 that may be incorporated in part or in whole within a field test facility or a remote laboratory facility. Radiometric characterization system 102 includes a radiometry system 104 that is configured for performing radiometric characterization and calibration operations. Radiometry system 104 includes optical sensor components 106, such as a sensor light source and an optical detector. To implement reference testing of the optical sensor components 106, radiometry system 104 also includes reference components 107, such as a reference light source and a reference optical detector. For example, and as depicted and described in further detail with reference to FIG. 2, various combinations of optical sensor components 106 and reference components 107 are installed and operated in an optical measurement path to collect optical component and reference optical response information.

The optical response information collected by radiometry system 104 is transmitted to and processed by a processing system 108 that is configured to determine parameter characterizations for optical sensor models. Processing system 108 includes a characterization application 109 that is configure using any combination of data and program logic to determine optical component characterization values such as calibration coefficients based on the optical responses from radiometry system 104. The optical components that are characterized may include discrete physical components such as light sources, optical detectors, and optical transform devices. The optical "components" for which the characterization values are determined may also or alternatively include optical properties of such physical components such as reflection, refraction, and diffusion values for or more optical components.

Processing system 108 further includes a model generator 111 that is configured to define a model for an optical sensor by selecting a model type and populating the model with components corresponding to the components characterized by characterization application 109. Model generator 111 generates a model in part by defining the components and in some embodiments defining parameters associated with the components. The parameters may include, for example, light emission parameters such as the voltage, current, or frequency of the light source supply, filament temperature, thickness of source containment, etc. The parameters may also include optical interaction parameters such as sample cell thickness, sample cell length, angular offset from nominal values of incidence/transmission/reflection angles. The parameters may further include parameters associated with optical detection such as angular offset, detector sensitivity with respect to radiation wavelength, etc.

Processing system 108 generates and outputs the characterization data and corresponding component model data in the form of component characterization records 110 and corresponding sensor configuration records 112 to a parameterization tool 114. Characterization records 110 contain the characterization values determined by characterization application 109 for a given optical sensor under test within radiometry system 104. Sensor configuration records 112 contain the component identification data and parameter definitions for the corresponding components of the optical sensor model. The characterization records 110, sensor configuration records 112, and optical responses measured by radiometry system 104 are transmitted to or accessed or otherwise received and processed by parameterization tool 114. Based on the component characterization records 110, parameterization tool 114 may determine parameters values and also a variability characteristic of the parameters in terms of being variable (e.g., light source temperature) or relatively fixed in and therefore substantially non-variable (e.g., lens refraction).

Parameterization tool 114 is configured using any combination of data and program logic to generate a parameterized model 116. Parameterized model 116 is generated, in part, by fitting a number (e.g., an integer, n, greater than zero) of variable parameters of the model components with the optical response data measured by radiometry system 104. A number of fitting algorithms such as curve fitting may be implemented. Parameterization tool 114 fits the number of variable parameters using optical responses, such as those collected by radiometry system 104, that are associated with optical sensor components to which the model components correspond. The parameterization by parameterization tool 114 may also include determining a number of parameters having a lower variability in terms of rate of variation (e.g., temporal or by usage) and/or range of variation. Parameterization tool 114 may fix a value for each of these lower variability parameters within parameterized model 116 based, for example, on an average of the optical responses. Parameterized model 116 may be transmitted to or otherwise retrieved by a models database 118 that records models corresponding to optical sensors that have been parameterized using reference type radiometric characterization.

System 100 further includes a measurement processing system 120 that is configured to process field measured optical response data collected by optical sensors and is communicatively coupled with database 118. Measurement processing system 120 may be incorporated within electronics and processing equipment within or proximate a well head apparatus (not expressly depicted). Such a well head apparatus may include mechanical, electrical, and electronic systems, subsystems, devices, and components for drilling a borehole 133 and subsequently retrieving hydrocarbon fluid from or injecting fluid into a subterranean region 125. Subterranean region 125 may include sedimentary layers, rock layers, sand layers, or combinations of these and other types of subsurface layers. One or more of the subsurface layers may contain fluids, such as water and liquid and/or gaseous hydrocarbon fluids.

Measurement processing system 120 is configured to interoperate with a downhole logging tool 130 in part by receiving and processing measurement information collected and generated by logging tool 130. In some embodiments, all or part of measurement processing system 120 may be implemented as a component of or may be fully or partially integrated with one or more components of logging tool 130. For instance, one or more components of a processing node 160 within measurement processing system 120 may be embedded within logging tool 130 and operate concurrently with ongoing downhole measurement operations within borehole 133.

Figure 7:
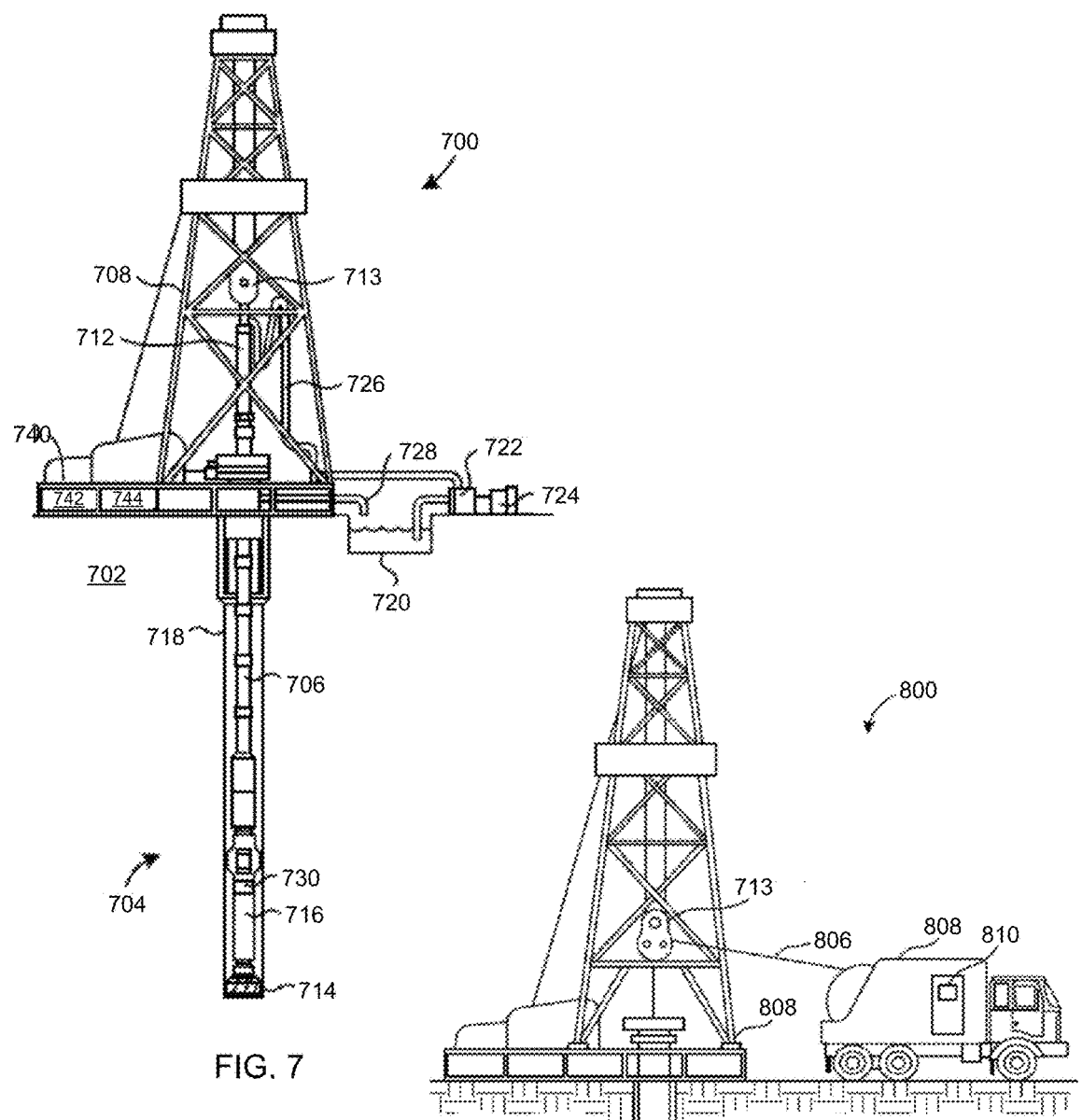
FIG. 7 illustrates a drilling system in accordance with some embodiments.

Processing node 160 includes processing and storage components configured to receive and process detected downhole information such as temperature, pressure, fluid properties, etc. During logging operations, logging tool 130 is disposed at various depths within borehole 133 via a conveyance mechanism such as a wireline 156. Logging tool 130 is communicatively coupled to measurement processing system 120 and processing node 160 via a telemetry link within wireline 156. In alternate embodiments such as depicted in FIG. 7, a telemetry link for a logging tool such as logging tool 130 may comprise components and connectivity media for establishing acoustic, optical, electronic, and/or electromagnetic communications links between logging tool 130 and processing node 160.

Logging tool 130 may include multiple sampling and measurement devices and associated control and communication electronics. In the depicted embodiment, logging tool 130 comprises a logging sonde 134 and an electronics assembly 135. Logging sonde 134 includes an optical sensor 136, a fluid density detector 138, and a controller 140. Fluid density detector 138 includes components configured to measure the density of fluids that are sampled within logging sonde 134. Optical sensor 136 includes components such as a light source 142, a sample cell 144, one or more optical transform components 146, and an optical detector 148. The components within optical sensor 136 interoperate to enable optical analysis of sampled materials such as sampled downhole fluids within borehole 133 such as formation fluids contained within subterranean region 125. Controller 140 may be a microcontroller configured to actuate, coordinate, and otherwise control operations of measurement components within logging sonde 134.

During a fluid sampling and measurement sequence, controller 140 actuates fluid intake and flow components such as valve to intake fluid from within borehole 133 into sample cell 144 of optical sensor 136. During an optical measurement interval, light source 142 transmits light toward and through the sample fluid within sample cell 144 to generate sample-interacted light. The sample-interacted light from sample cell 144 propagates to the optical transform components 146 that may comprise any combination of lenses, refractory components, scattering components, filters, etc. In some embodiments optical transform components 146 may include an optically reactive optical sensor configured to perform a spectral processing function. For example, optical transform components 146 may include an optical band-pass filter or a multivariate optical sensing element.

Having been optically interacted via optical transform components 146, the optically interacted light is received and measured by optical detector 148, resulting in an optical response signal generated by optical detector 148. Attributes of the received optically interacted light, such as wavelength, amplitude, and phase, are represented in the optical response signal that is processed by optical receiver components within the electronics assembly 135 of logging tool 130. Electronics assembly 135 includes, in part, a measurement sequence controller 150 configured to implement measurement cycles such as implemented by density detector 138 and optical sensor 136. Electronics assembly 135 further includes a log unit 152 that is configured to process and record measurement data based on the detected response signals from density detector 138 and optical sensor 136.

Logging tool 130 may collect the downhole measurement data including densities and optical responses from fluid samples at various positions along the length of borehole 133. For example, logging tool 130 may be incrementally moved upwardly or downwardly to each logging position at a series of depths within borehole 133. At each logging position, instruments in logging tool 130 implement measurements on materials and/or environment conditions within borehole 133 and/or the subterranean region 125 surrounding the borehole. The measurement data is communicated to processing node 160 within measurement processing system 120 for storage, processing, and post-processing analysis. While collection of data using a wireline deployment is depicted in FIG. 1, such data may be gathered and analyzed during drilling operations (e.g., during logging while drilling (LWD) operations), during wireline logging operations, or during other types of downhole operations. Processing node 160 is configured to receive and analyze the optical response data and other measurement data from logging tool 130 to determine downhole and formation properties and conditions. For example, processing node 160 may be configured to identify fluid composition and physical properties such as density and viscosity, as well as material (e.g., chemical) composition of sample downhole fluids.

The optical response data comprising signal attributes such as frequency and amplitude that are collected during optical measurement sequences may be recorded by logging unit 152 in defined data structures such as records within a log file 155. Log file 155 is transmitted from electronics assembly 135 to a communication interface (not depicted) within measurement processing system 120 from which is may be transferred to and recorded by processing node 160. Log file 155 may also or alternatively be provided directly as streamed data or otherwise real-time formatted data to processing node 160. Processing node 160 is configured, using any combination of hardware and software devices and program components, to generate fluid analysis results based on the optical responses in combination with parameterized or re-paremeterized models that may be retrieved or otherwise operably accessed from models database 118.

The hardware within processing node 160 incudes a processor 162 configured to execute instructions corresponding to program instructions loaded into an associated memory device 164. The software stored or retrieved by or otherwise accessible for loading into memory 164 includes a fluid analysis tool 166, which is configured to implement fluid composition detection. Fluid analysis tool 166 implements fluid composition detection, including chemical identification of sample fluids, by selecting a parameterized model from database 118 that corresponds to the optical sensor 136, or more components of optical sensor 136, from which the optical response data is received. The parameterized model is executed by fluid analysis tool 166 with the optical response data as input to determine properties of the downhole material samples to which the optical responses correspond.

The accuracy of the parameterized model in terms of optical response processing depends on how closely the parameterization (i.e., the fitting of the variable parameters) matches the optical properties of the optical sensor components. Some optical sensor components such as a light source or filament of a light source may undergo significant physical transformation over time and usage cycles resulting in substantial performance drift. Re-characterizing optical sensors in a controlled laboratory environment or even in the field may be relatively expensive in terms of radiometric test equipment such as within characterization system 102. Radiometric re-characterization is also costly in terms of formation test delays and may result in longer re-characterization intervals that may compromise fluid test results.

Disclosed embodiments include operations, functions, and components for reducing the cost of radiometric re-characterization and reducing the requisite frequency of such re-characterization. In one aspect, disclosed embodiments include a substantially portable and flexibly configured radiometry system that utilizes a transmissive type light diffuser instead of, for example, a reflective type diffuser. In a second aspect, disclosed embodiments utilize optical measurements of reference materials in combination with the radiometrically parameterized models to re-parameterize the models to maintain accuracy of fluid analysis results such as from fluid analysis tool 166.

System 100 may be configured to implement one or both aspects of the disclosed embodiments that address inefficiencies associated with radiometric characterization and re-characterization. Regarding the first aspect, and as depicted and described in further detail with reference to FIGS. 2-5, radiometry system 104 may be further configured to implement optical measurement paths that utilize transmissive optical diffusers that are configured to maximize source light propagation intensity and also are far less expensive and more portably that reflective-type diffusers. Regarding the second aspect, system 100 is further configured to implement reference material measurements that may be utilized to adjust the parameterization (i.e., re-parameterize) the models such as those recorded in database 118.

In some embodiments, a determination is made based on expiration of a re-characterization period or otherwise that optical sensor 136 requires re-characterization. To implement re-characterization, a reference material such as a reference sample fluid is deposited within sample cell 144 to be measured by optical sensor 136. For example, the reference material may be a pre-selected fluid maintained in storage and having multiple known physical properties such as material composition and variations in density and viscosity based on temperature. In addition or alternatively, the reference material may be a downhole fluid sample for which one or more physical and optically significant properties such as density and viscosity are determined and therefore known in real-time. Such properties may be determined by downhole operation of logging tool 130 such as measurements by density detector 138.

To support the re-characterization, fluid analysis tool 166 includes components configured to interoperate with parameterization tool 114 to re-parameterize a previously parameterized model using one or more reference material measurements. For example, fluid analysis tool 166 and parameterization tool 114 may re-parameterize model 116 corresponding to optical sensor 136 using a reference sample stored within logging sonde 134 in a reference fluid cell 149. In some embodiments, several optically significant properties such as chemical composition and variation in density and/or viscosity with temperature are pre-determined or otherwise known and are specified by records within processing node 160. An optical sensor re-characterization (e.g., re-calibration) cycle may begin with controller 140 actuating flow control mechanisms within logging sonde 134 to deposit the reference fluid within cell 149 into the sample cell 144 of optical sensor 136. Optical sensor 136 is activated to obtain/measure an optical response of the reference fluid via optical detector 148.

The optical response and other information relating to the condition of the fluid that may affect its optical properties such as downhole temperature measured by another sensor (not depicted) are transmitted to processing node 160. Processing node 160 is configured to retrieve the recorded optically significant property information regarding the reference fluid. Processing node 160 may be further configured via programmed constructs such as fluid analysis tool 166 to determining some of the optical property information based on downhole measurements such as temperature and/or density of the reference fluid as may also be measured downhole. Fluid analysis tool 166 determines a reference fluid composition result based on the reference sample optical response. Fluid analysis tool 166 is further configured to determine optical component characterizations for optical sensor 136 based on comparing the reference fluid composition result with the known fluid composition and other measured fluid properties that affect the measured optical response. Based on the comparison, fluid analysis tool 166 generates a reference fluid characterization file 170 comprising re-characterization of one or more of the variable optical sensor parameters based on the comparison/correlation between the measured reference response and known reference fluid properties.

Measurement processing system 120 transmits characterization file 170 to a local or remote data processing system in which parameterization tool 114 executes and that will receive and process the file. In addition to the parameter re-characterization, characterization file 170 includes an identifier associated with the optical sensor model (e.g., model 116) that is being re-characterized. Parameterization tool 114 is configured to retrieve the parameterized model (e.g., model 116) from models database 118 and re-parameterize the retrieved model by re-fitting a subset of the original set of fitted parameters (e.g., subset, m, of the n originally fitted parameters). The refitting of the subset of variable parameters is based, at least in part, on the parameter re-characterization information in file 170 that was determined based on the reference material optical response. The re-parameterized model may then be transmitted to and recorded in models database 118 from which it may be accessible by measurement processing system 120 for further field measurements.

Figure 2:
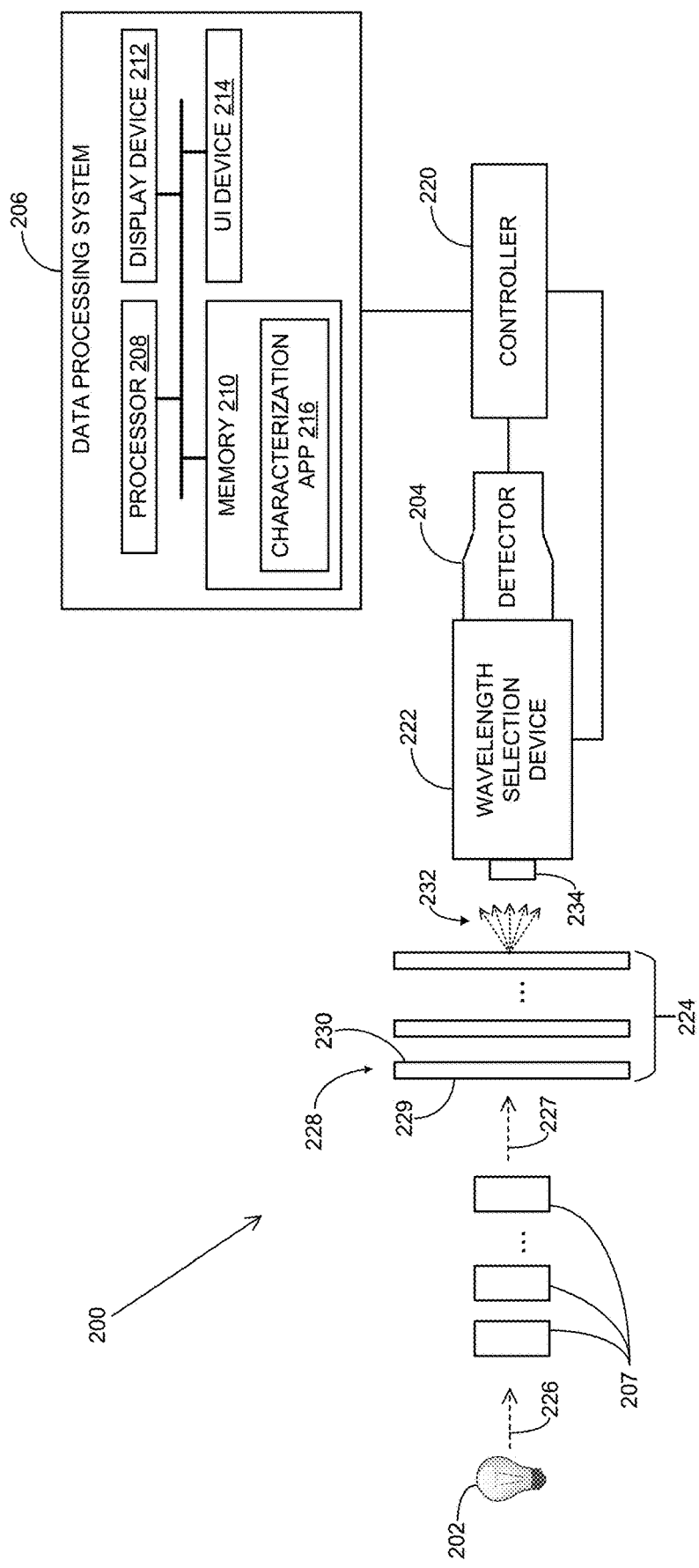
FIG. 2 is a block diagram illustrating a radiometry system in accordance with some embodiments.

Accuracy and efficiency of the radiometric characterization utilized as the foundation of the parameterization model may be enhanced by embodiments such as disclosed in FIGS. 2-5. FIG. 2 is a block diagram depicting a radiometry system 200 in accordance with some embodiments. The sub-systems, devices, components, operations, and functions depicted and described with reference to radiometry system 200 may be implemented by the radiometric characterization system 104 in FIG. 1. Radiometry system 200 includes sub-systems, devices, and components configured to implement characterization and related calibration techniques applicable to components and systems that implement electromagnetic (EM) radiation measurement operations. EM radiation measurement operations performed by components tested by radiometry system 200 may include spectroscopic analysis of how EM radiation interacts with various types of matter. Spectroscopic analysis may be performed on formation materials and fluids by deploying an optical measurement system downhole and/or may be implemented in a surface field test site in which the optical measurement system measures spectral transformation properties of solids and/or fluids sampled downhole and transported to the surface field test site. The range of EM radiation included in optical measurements used for spectroscopic analysis is typically EM "light" radiation, including visible, infrared, and ultraviolet spectra, collectively referred to as light energy, light waves, light, optical waves, optical energy, etc.

Radiometry system 200 is configured to determine and compare performance metrics for one or more test components (i.e., components to be deployed in an optical measurement system) and one or more corresponding reference components (i.e., components having known operational parameters). As utilized herein a test component may be referred to as an "uncharacterized" component and a reference component as a "characterized" component. Radiometry system 200 may be configured to measure performance values for a component under test (e.g., a test optical detector) that correspond to input from a reference component (e.g., a reference light source) and input from another test component (e.g., a test light source). The sequence of measurements performed by radiometry system 200 are utilized to quantify performance degradation of the test components over periods of usage in the field.

An optical train within radiometry system 200 includes an interchangeable light source 202 that generates and transmits EM light radiation that is detected by an optical detector 204. Light source 202 may comprise a broad-spectrum or narrow-spectrum source that generates light 226 in the visible, infrared, or ultraviolet spectra ranges. Light, such as light 226, generally refers to non-scattered/non-diffused light transmitted from a point source such as light source 202. Example implementations of light source 202 include electroluminescence sources such as an electroluminescent lamp, laser, LED, etc. Light source 202 is interchangeable in terms of comprising either a test light source or a reference light source, depending on the optical measurement cycle within an overall characterization sequence.

Optical detector 204 is configured to generate response signals corresponding to metrics such as intensity and/or frequency of light energy originating from light source 202 and propagating through the optical train until being received by optical detector 204. Like light source 202, optical detector 204 is interchangeable in terms of comprising either a test optical detector or a reference optical detector, depending on the optical measurement cycle within an overall calibration sequence. In some embodiments, optical detector 204 may include a photoreactive component such as a photodiode that converts light energy into electrical current. Optical detector 204 may also or alternatively include other types of optical transducer components such as a photo-acoustic detector, a piezo-electric detector, a charge coupled device detector, a photon detector, and any combination thereof. In response to receiving/detecting light energy, optical detector 204 generates corresponding response signals that are transmitted to a data processing system 206 such as via a controller 220.

During and/or following optical measurement cycles, detector response information from optical detector 204 is processed by data processing system 206 to determine and compare performance metrics of one or more of the components, including light source 202 and optical detector 204 within the optical measurement path. For instance, data processing system 206 may comprise processing components configured to derive characterization values such as calibration coefficients from the raw and/or pre-processed detector response data.

Data processing system 206 includes a memory device 210 into which components of a characterization application 216 are loaded and a processor 208 for executing instructions to implement operations and functions encoded in characterization application 216.

Characterization application 216 includes program instructions configured to determine characterization values such as calibration coefficients based on response information received from optical detector 204 over one or more optical measurement cycles. Data processing system 206 may further include a user input device 214 that may be used individually or in conjunction with a display device 212 to input instructions and provide intermediary results data from the measurement and characterization processes.

Some field optical measurement systems are configured to detect spectral results that may be determined, at least in part, by the use of optical filter components that selectively remove particular spectral components. Therefore, the information required to determine optimally comprehensive characterization values may require responses generated by optical detector 204 having a similar spectral selectivity. In the depicted embodiment, the optical train includes a wavelength selection device 222 positioned at the input of optical detector 204. Wavelength selection device 222 is configured to selectively pass/reject one or more wavelength components of light energy received by wavelength selection device 222. In some embodiments, wavelength selection device 222 may be a monochromator that includes a wavelength/frequency selective filter that filters the light energy to provide a monochromatic spectral output to optical detector 204. The spectral output comprises light energy components within a spectral range determined in accordance with the design, configuration, and settings of wavelength selection device 222.

Radiometry system 200 is configured to characterize, such as by measuring performance values for, a test optical sensor that includes one or more optical sensor components including a light source and an optical detector. Characterizing an optical sensor and/or components within the optical sensor may entail measuring field/test component performance based on optical responses generated by detector 204. For some measurement cycles in which the performance of one or more components of the optical sensor is measured, a test light source (i.e., uncharacterized light source) may be utilized as light source 202 and a reference detector (i.e., characterized detector) may be utilized as optical detector 204. For other measurement cycles in which the performance of one or more components of the optical sensor is measured, a reference (i.e., characterized) light source is utilized as light source 202 and a test (i.e., uncharacterized) detector is utilized as optical detector 204.

In addition to the light source and optical detector the optical sensor components under radiometric test may include one or more optical sensor components 207 that form an intermediary portion of an overall optical train that begins with light source 202 and ends with detector 204. For example, optical components 207 may comprise optical components such as lenses, filters, and other types of optical components through which light propagates in a field optical system. In this manner, light 226 may be modified in some ways to become a light 227 from the end of the series of optical system components 207. Radiometry system 200 may perform a sequence of optical response and other measurements that are utilized to quantify individual and/or combined performance of one or more test components. During and/or following optical measurement cycles, detector response information from optical detector 104 is processed by data processing system 206 to determine and compare performance metrics of various subsets of an overall optical system comprising optical system components 207 as well as light source 202 and optical detector 204.

Optical system component performance metrics are compared across measurement cycles to determine characterization values such as calibration coefficients. To determine the test component performance metrics in a manner that the results may be utilized for calibration, the performance metrics may be normalized such as by comparing test component performance with performance metrics of reference components. For instance, radiometry system 200 may be configured to implement sequences of optical measurement cycles using corresponding combinations of test and/or reference components in the optical train.

Externally induced variations in optical characterization metrics are minimized by utilizing a consistently configured optical measurement path between measurement cycles. The absolute and relative positioning of the optical components within an optical train are substantially (to the extent practicable) the same between measurement cycles. However, between measurement cycles one or more optical train components such as light source 202, optical detector 204, and/or other components not depicted may be replaced. For example, light source 202 may be a reference light source that is replaced with a test light source and similarly for optical detector 204. Since replacing even a single component in the optical train may alter alignment of portions of the measurement path, a transmissive diffuser may be included in the optical train to at least partially negate the effects of differing alignments on light energy such as generated by light source 202.

In the depicted embodiment, the optical train of radiometry system 200 includes an in-line, transmission-based diffusion component in the form of a transmissive diffuser 224. Transmissive diffuser 224 is configured to include one or more transmissive scattering boundaries through which light 226 is diffused as it propagates toward optical detector 204. The diffusion path is in alignment with the original propagation direction of the light 126 in the depicted configuration in which light source 202, transmissive diffuser 224, and optical detector 204 are axially aligned. In some embodiments, such as during operation of radiometry system 200, substantial diffusion of light 226 may be achieved by material composition and other structural aspects of transmissive diffuser 224 that results in light 226 being scattered while propagating through transmissive diffuser 224. The transmissive diffusion may result in substantially lower energy losses that may occur for reflective type light scattering devices such as integrating spheres. For example, the lossy reflections within an integrating sphere results in a total attenuation factor on the order of the ratio of the exit aperture area divided by the total internal sphere area.

The transmissive, in-line configuration of transmissive diffuser 224 provides lower and adjustably lower light energy attenuation as well as a more flexibly configurable overall optical measurement path. As shown, transmissive diffuser 224 comprises multiple translucent elements, such as translucent plates, including a translucent element 228. The translucent elements within transmissive diffuser 224 are axially aligned with the propagation path of light 226 generated by light source 202. Each of the translucent elements may be comprised of a non-crystalline amorphous solid material such as glass. Also, or alternatively the translucent elements of transmissive diffuser 224 may comprise polymers, liquid crystals, silicon, or other materials through which at least a portion of light 226 may propagate.

In addition to enabling light propagation via translucence, the translucent elements also include material composition and/or structural features that scatter the light 226 as it propagates through transmissive diffuser 224 to become diffused light 232. In some embodiments, the structural features that scatter the propagating light, also referred to as diffusion structures, comprises one or more scattering layers formed on one or both surfaces of each of the translucent elements. For instance, translucent element 228 may comprise a plate-like body having a substantially planar front side surface 229 and a substantially planar back side surface 230. As depicted and described in further detail with reference to FIGS. 3A and 3B, front side surface 229 and/or back side surface 230 may include diffusion structures comprising roughened surfaces that implement the light scattering function of translucent element 228. Each of the other translucent elements within transmissive diffuser 224 may similarly include roughened surfaces, such as roughened front side and/or back side surfaces, that individually and cumulatively result in diffused light 232 exiting transmissive diffuser 224. A lens 234 may be deployed at or proximate to an input port of wavelength selection device 222 to focus or otherwise intensify the light energy within diffused light 232.

Figure 3A:
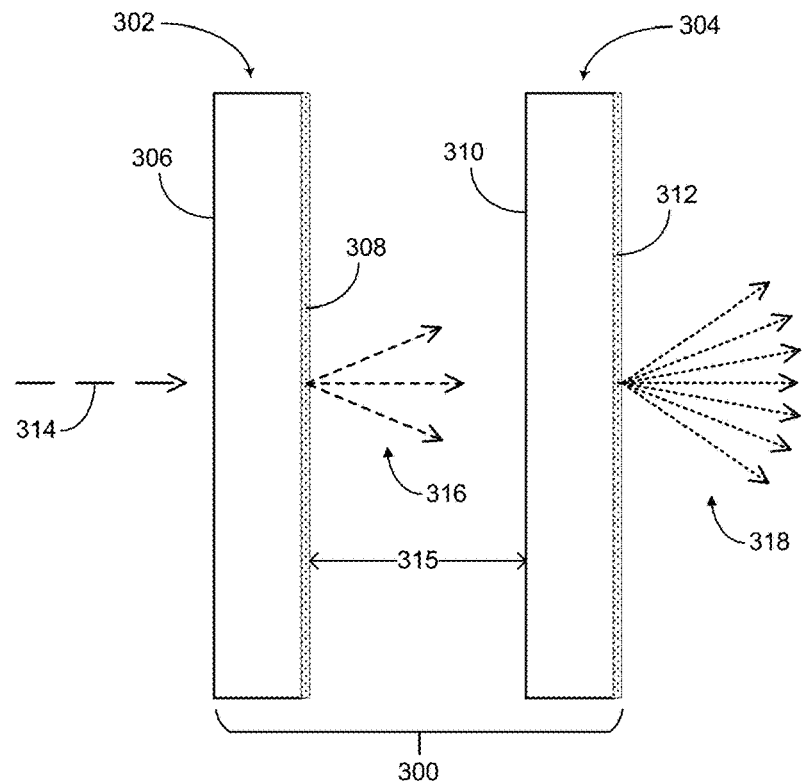
FIGS. 3A and 3B depict transmissive diffusers that may be utilized in a radiometry system in accordance with some embodiments.

FIG. 3A illustrates a transmission-based optical diffuser in the form of a transmissive diffuser 300 that may be implemented as transmissive diffuser 124 in one or more of the radiometry systems depicted in FIGS. 1 and 2 in accordance with some embodiments. Transmissive diffuser 300 comprises a first translucent element 302 and a second translucent element 304 that each comprise material, such as glass, formed as substantially plate-like material layers. Translucent element 302 includes a front side surface 306 and a back side surface 308 each of which are substantially planar. The front side surface 306 is substantially smooth and therefore a light 314, while possibly moderately refracted, is not substantially scattered as it propagates into and through front side surface 306. The back side surface 308 is a diffusion structure comprising a substantially planar surface that is roughened, comprising relatively small surface irregularities such as may be implemented by mechanical and/or chemical roughening procedures.

The light 314 continues propagating through translucent element 302 until reaching back side surface 308 at which the light is scattered by surface irregularities, resulting in release of initially diffused light 316. The initially diffused light 316 radiates in a diffused manner over a distance 315 to a front side surface 310 of translucent element 304. In some embodiments, distance 315 comprises a distance of between and including 0.5 and 1.5 inches. Front side surface 310, like the front side surface 306 of translucent element 302 is substantially smooth. Therefore, the incident initially diffused light 316 is not substantially scattered as it reaches and passes through front side surface 310. The initially diffused light 316 continues propagating through translucent element 304 until reaching a back side surface 312, that like back side surface 308 is a diffusion structure comprising a substantially planar surface having a roughness level sufficient to substantially scatter the initially diffused light 316, resulting in release of secondarily diffused light 318.

Figure 3B:
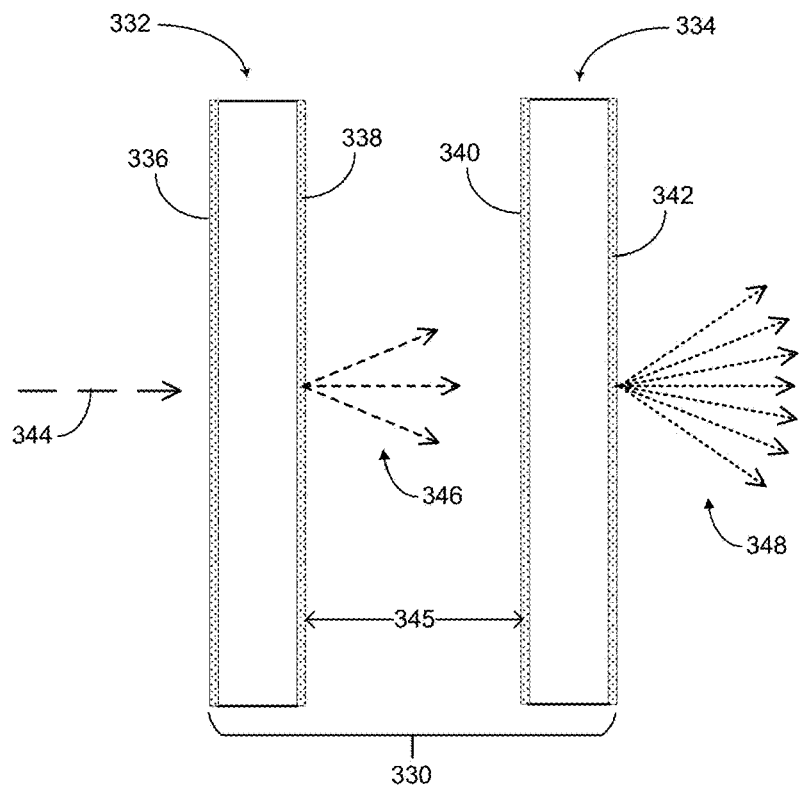

FIG. 3B depicts a transmission-based transmissive diffuser 330 that may be utilized in radiometry systems such as the radiometry systems depicted in FIGS. 1 and 2 in accordance with some embodiments. Transmissive diffuser 330 comprises a first translucent element 332 and a second translucent element 334 that each comprise material, such as glass, formed as substantially plate-like material layers. Translucent element 332 includes a front side surface 336 and a back side surface 338 each of which are substantially planar. Both the front side surface 336 and back side surface 338 of translucent element 332 comprise substantially roughened planar surfaces such as may be produced by applying mechanical and/or chemical roughening procedures to produce surface irregularities. An incident light 344 is therefore scattered as it reaches and passes through each of the roughened surface boundaries formed by front side surface 336 and back side surface 338, resulting in diffused light 346 radiating in a diffused manner across a distance 345 to translucent element 334. In some embodiments, distance 345 comprises a distance of between and including 0.5 and 1.5 inches. Both a front side surface 340 and a back side surface 342 of translucent element 334 comprise substantially roughened planar surfaces. Therefore, the incident diffused light 346 is substantially scattered as it reaches and passes through each of the roughened surface boundaries formed by front side surface 340 and back side surface 342, resulting in further diffused light 348 radiating from transmissive diffuser 330.

Figure 4A:
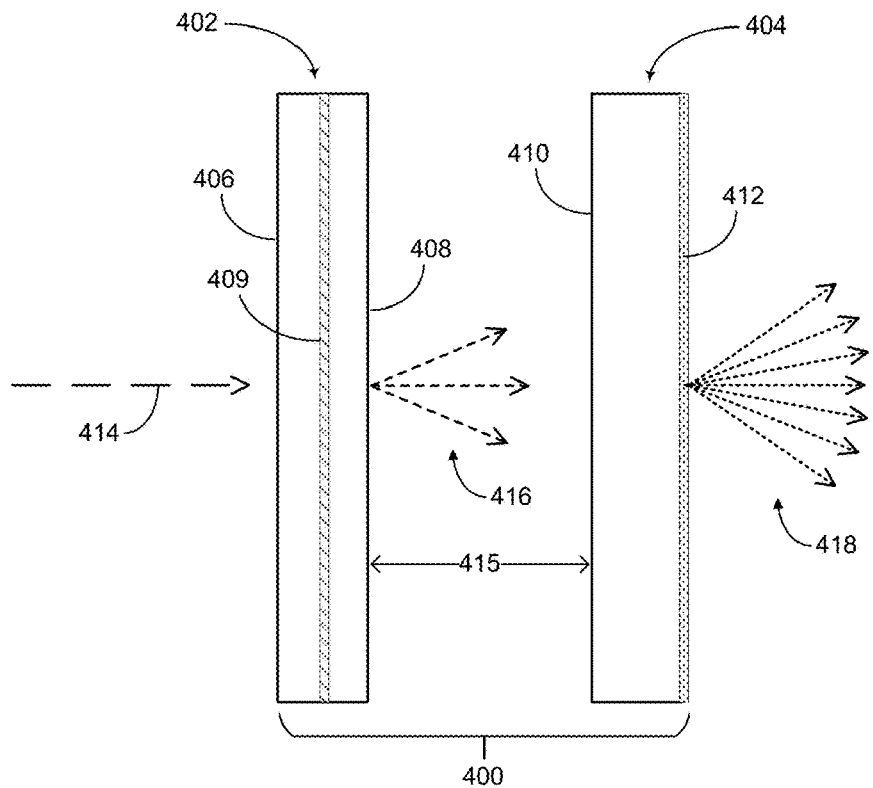
FIGS. 4A and 4B illustrate transmissive diffusers that may be utilized in a radiometry system in accordance with some embodiments.

In some embodiments, a radiometry system may include a transmissive diffuser having alternative surface diffusion structures such as surface coating of translucent or semi-translucent material. A radiometry system may also or alternatively implement a transmissive diffuser having internal diffusion structures. For example, FIG. 4A illustrates a transmission-based optical diffuser in the form of a transmissive diffuser 400 that may be utilized in radiometry systems such as the radiometry systems depicted in FIGS. 1 and 2 in accordance with some embodiments. Transmissive diffuser 400 comprises a first translucent element 402 and a second translucent element 404 that each comprise material, such as glass, formed as substantially plate-like material layers. In contrast to the translucent element configurations shown in FIGS. 3A and 3B, translucent element 402 includes an internal diffusion structure in the form of a diffusion material layer 409 within the body of translucent element 402. A light 414, while possibly moderately refracted, is not substantially scattered as it propagates into and through a front side surface 406.

The light 414 continues propagating through translucent element 402 until reaching diffusion material layer 409 at which the light is scattered, resulting in release of initially diffused light 416 through the back side 408. The initially diffused light 416 radiates in a diffused manner over a distance 415 to a front side surface 410 of translucent element 404. In some embodiments, a distance 415 between back side 408 and a front side 410 of translucent element 404 comprises a distance of between and including 0.5 and 1.5 inches. Front side surface 410, like the front side surface 406 of translucent element 402 is substantially smooth. Therefore, the incident initially diffused light 416 is not substantially scattered as it reaches and passes through front side surface 410. The initially diffused light 416 continues propagating through translucent element 404 until reaching a roughened back side surface 412 that scatters the initially diffused light 416, resulting in release of secondarily diffused light 418.

Figure 4B:
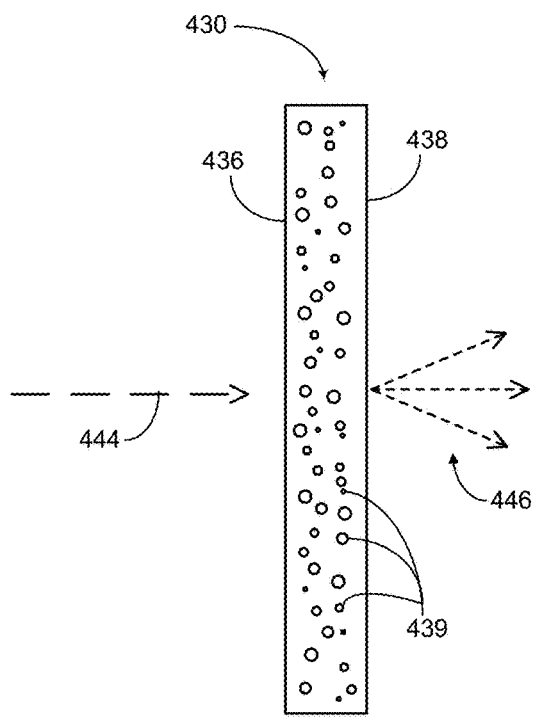

FIG. 4B illustrates a transmission-based optical diffuser in the form of a transmissive diffuser 430 that may be utilized in radiometry systems such as the radiometry systems depicted in FIGS. 1 and 2 in accordance with some embodiments. Transmissive diffuser 430 comprises a single translucent element that like translucent element 402 includes an internal diffusion structure. The translucent element comprises a first matrix material, such as glass, formed as substantially plate-like body member. An internal diffusion structure is disposed within the translucent element in the form of multiple particulates 439 that may be randomly distributed throughout the matrix material volume of transmissive diffuser 430. In some embodiments, particulates 439 may comprise differently sized particulates comprising a material that is translucent to the wavelengths of light to be detected and having a different index of refraction than the matrix material of translucent element 430 in which particulates 439 are suspended. A light 444, while possibly moderately refracted, is not substantially scattered as it propagates into and through a front side surface 436. As light 444 propagates into and through transmissive diffuser 430, light 444 is scattered, resulting in release of diffused light 446 through the back side 408.

Figure 5:
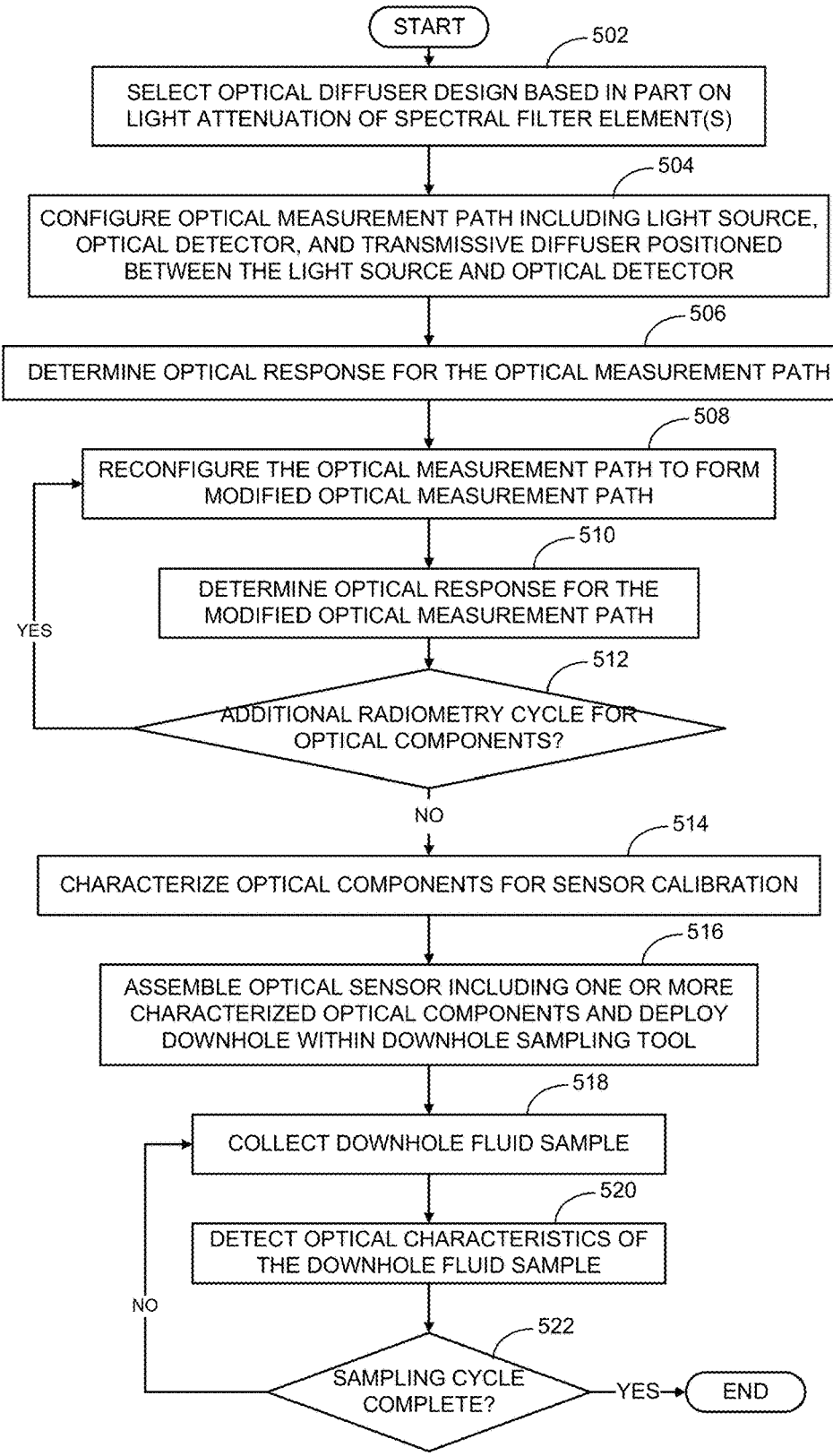
FIG. 5 is a flow diagram depicting operations and functions for radiometrically characterizing components of an optical sensor and utilizing the radiometric characterization for downhole fluid sampling.

FIG. 5 is a flow diagram illustrating operations and functions for characterizing optical components and utilizing the characterized optical components for downhole fluid sampling and measurements in accordance with some embodiments. The process begins as shown at block 502 with the selection of an optical diffuser design based on the types of optical components to be included in an optical measurement path. For example, variations in the optical diffuser type/design that may be selected are illustrated and described with reference to FIGS. 1, 2, 3A, 3B, 4A, and 4B. The optical diffuser design may be selected such that the level of diffusion provided by the selected design varies inversely with the level of light attenuation of the optical components in the measurement path. In some embodiments, the optical diffuser design is selected based on the light attenuation characteristics of optical components that operate as spectral filter elements. The selection of an optical diffuser design may be implemented by programmed elements such as those stored and executed on data processing system 206 depicted in FIG. 2.

At block 504, an optical measurement path that includes an optical diffuser having the selected design is configured. As depicted in FIG. 2, the optical measurement path may include various combinations of optical and measurement components. The combinations of possible optical and measurement components include, among other possible components, a light source, an optical detector and the optical diffuser positioned between the light source and the optical detector. At block 506, an optical response for the optical measurement path is measured or otherwise determined using the optical detector among other possible components.

At block 508, the optical measurement path is reconfigured in terms of replacing at least one of the optical or measurement components in the measurement path. For example, if the initial measurement path configured as shown at block 504 included a reference light source, the reconfiguration at block 508 may include replacing the reference light source with a field light source (i.e., a light source to be deployed in a downhole optical sensor). As shown at block 510, an optical response for the reconfigured optical measurement path is measured or otherwise determined using the optical detector among other possible components. At inquiry block 512 control passes back to block 508 if additional radiometry cycles remain to be performed.

When all radiometry cycles have been performed using one or more reconfigured optical measurement paths, control passes to block 514 that illustrates characterization of the optical field components included in one or more of the optical measurement paths. The characterizations may be used for various purposes including calibration of an optical sensor that incorporates one or more of the optical components. Such characterization and calibration operations may be implemented by programmed elements such as those stored and executed on data processing system 108 in FIG. 1 and data processing system 206 in FIG. 2.

At block 516, an optical sensor is assembled to include one or more of the optical devices that were characterized at blocks 502-514 and the optical sensor is deployed downhole within a downhole sampling tool. At block 518, the downhole tool collects a fluid sample, such as may be a formation fluid, to be measured or otherwise characterized at least in terms of optical properties by the optical sensor. At block 520, the optical sensor is utilized to detect the optical characteristics, such as may relate to spectral responses, of the collected downhole fluid. Programmed elements includes with the optical sensor or executed by another information processing system may be used to compute, calculate, or otherwise determine the material/chemical composition of the collected downhole fluid based on the determined optical responses/characteristics. The collection and processing of downhole fluid samples may continue with control passing from block 520 back to block 518 until the downhole fluid sampling cycle terminates.

Figure 6:
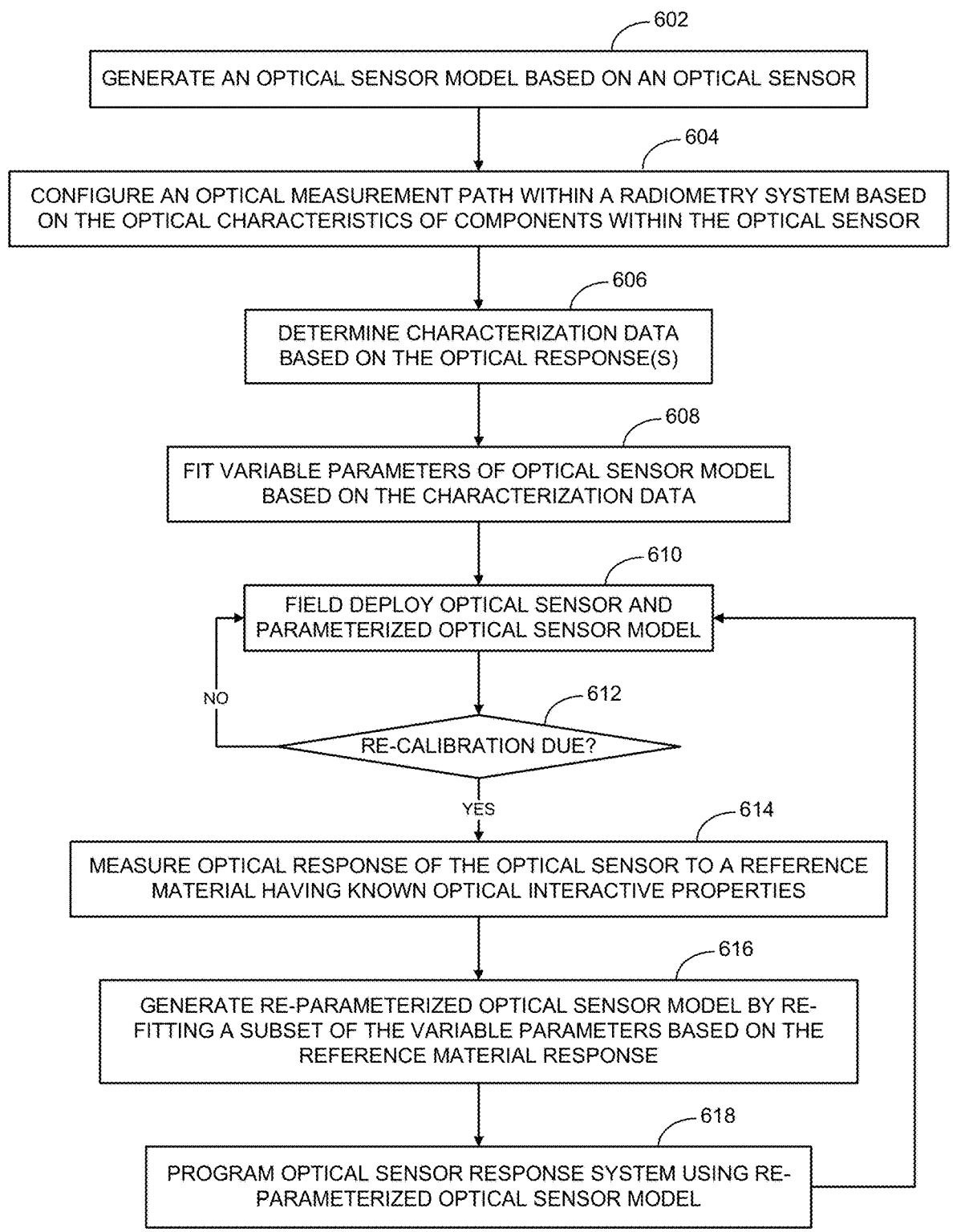
FIG. 6 is a flow diagram depicting operations and functions for utilizing radiometric characterization of an optical sensor to re-characterize the optical sensor using reference sample material response data.

FIG. 6 is a flow diagram depicting operations and functions for utilizing radiometric characterization of an optical sensor to re-characterize the optical sensor using reference sample material response data. The operations and function depicted and described with reference to FIG. 6 may be implemented for radiometric characterization and reference material re-characterization by one or more of the systems, devices, and components depicted and described with reference to FIGS. 1-5 and 7-8. The process begins as shown at block 602 with a model generator, such as model generator 111, generating an optical sensor model comprising model components of a particularly configured optical sensor. The model generator may be deployed as a programmed processing element that receives via user input or otherwise information describing a type of optical sensor including optical components that may comprise descriptions of optical characteristics (e.g., reflection) within the optical sensor. The model may be constructed using a selected one or more model types such as grey body emission, fluorescence, stimulated emission, etc.

Whether prior to or following model generation, a radiometric characterization phase begins as shown at block 604 with configuration of an optical measurement path that includes optical components of an optical sensor. An example of such optical measurement path is depicted and described with reference to FIG. 2 as including light source components, optical detector components, and intermediary optical transform components. As indicated at block 604 the measurement path may be configured, particularly in terms of the type of optical diffuser utilized, based on optical characteristics of components in the optical train. At block 606, a characterization application such as depicted and described with reference to FIGS. 1 and 2 is utilized to determine characterization data for one or more of the optical components being characterized. The characterization application determines the characterization data based, at least in part, on the optical responses obtained and measured by the radiometry system.

The process continues as shown at block 608 with a parameterization tool, such as parameterization tool 114, generating a parameterized model by fitting a number of variable and optically significant parameters of the model based on the characterization data. Having been otherwise characterized via the characterization data and calibrated via the parameterized model, the optical sensor may be field deployed to implement optical analysis of sample materials (block 610). Such a sensor is depicted as optical sensor 136 in FIG. 1. The optical sensor may have an assigned re-calibration period that may be defined as a sensor usage time period or number of measurement cycles. Upon expiration of the re-calibration period at block 612, control passes to block 614 at which a reference material re-characterization cycle begins. As shown at block 614, the re-characterization of the optical sensor begins with the optical sensor obtaining/measuring an optical response to a reference material for which at least one, and typically several, optically significant material properties are known and recorded in the re-characterization system.

Reference re-characterization continues at block 616 with a programmed components such as fluid analysis tool 166 and parameterization tool 114 interoperating to generate a re-parameterized model by refitting a number of the variable parameters fitted at block 608 based, at least in part, on the measurement optical response to the reference materials. In some embodiments, the number of parameters refit at block 616 is less that the number radiometrically fit at block 608 with additional parameter information determined or derived from the known properties information for the reference material. The optical sensor measurement processing system, such as system 120, may be re-programmed in terms of retrieving, loading, and executing the updated (i.e., re-characterized) model (block 618) for subsequent optical measurements by the optical sensor (control returning to block 610).

FIG. 7 illustrates a drilling system 700 in accordance with some embodiments. Drilling system 700 is configured to including and use optical components for measuring properties of downhole material such as downhole fluids for example to determine the chemical composition or other composition aspects of the downhole materials. The resultant downhole material properties information may be utilized for various purposes such as for modifying a drilling parameter or configuration, such as penetration rate or drilling direction, in a measurement-while-drilling (MWD) and a logging-while-drilling (LWD) operation. Drilling system 700 may be configured to drive a bottom hole assembly (BHA) 704 positioned or otherwise arranged at the bottom of a drill string 706 extended into the earth 702 from a derrick 708 arranged at the surface 710. Derrick 708 may include a kelly 712 and a traveling block 713 used to lower and raise kelly 712 and drill string 706.

BHA 704 may include a drill bit 714 operatively coupled to a tool string 716 that may be moved axially within a drilled wellbore 718 as attached to the drill string 706. During operation, drill bit 714 penetrates the earth 702 and thereby creates wellbore 718. BHA 704 may provide directional control of drill bit 714 as it advances into the earth 702. Tool string 716 can be semi-permanently mounted with various measurement tools (not shown) such as, but not limited to, MWD and LWD tools, that may be configured to perform downhole measurements of downhole conditions. In some embodiments, the measurement tools may be self-contained within tool string 716, as shown in FIG. 7.

Drilling fluid from a drilling fluid tank 720 may be pumped downhole using a pump 722 powered by an adjacent power source, such as a prime mover or motor 724. The drilling fluid may be pumped from the tank 720, through a stand pipe 726, which feeds the drilling fluid into drill string 706 and conveys the same to drill bit 714. The drilling fluid exits one or more nozzles arranged in drill bit 714 and in the process cools drill bit 714. After exiting drill bit 714, the drilling fluid circulates back to the surface 710 via the annulus defined between wellbore 718 and drill string 706, and in the process, returns drill cuttings and debris to the surface. The cuttings and mud mixture are passed through a flow line 728 and are processed such that a cleaned drilling fluid is returned down hole through stand pipe 726.

Tool string 716 may further include a downhole tool 730 similar to the downhole tools described herein. More particularly, downhole tool 730 may have a calibrated optical sensor comprising optical components arranged therein, and the downhole tool 730 may have been calibrated or otherwise characterized prior to being introduced into the wellbore 718 using the radiometric characterization testing described herein. Moreover, prior to being introduced into the wellbore 718, downhole tool 730 may have been optimized by the steps described with reference to FIG. 6. Downhole tool 730 may be controlled from the surface 710 by a computer 740 having a memory 742 and a processor 744. Accordingly, memory 742 may store commands that, when executed by processor 744, cause computer 740 to perform at least some steps in methods consistent with the present disclosure.

Figure 8:
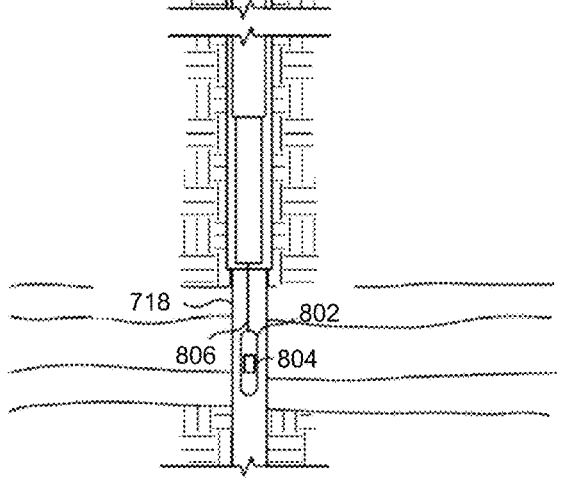
FIG. 8 depicts a wireline logging system in accordance with some embodiments.

FIG. 8 illustrates a wireline system 800 that may employ one or more principles of the present disclosure. In some embodiments, wireline system 800 may be configured to use a formation tester and calibrated optical tool. After drilling of wellbore 718 is complete, it may be desirable to determine details regarding composition of formation fluids and associated properties through wireline sampling. Wireline system 800 may include a downhole tool 802 that forms part of a wireline logging operation that can include one or more optical measurement components 804, as described herein, as part of a downhole measurement tool. Wireline system 800 may include the derrick 708 that supports the traveling block 713. Wireline logging tool 802, such as a probe or sonde, may be lowered by a wireline cable 806 into wellbore 718.

Downhole tool 802 may be lowered to potential production zone or other region of interest within wellbore 718 and used in conjunction with other components such as packers and pumps to perform well testing and sampling. More particularly, downhole tool 802 may include a calibrated optical sensor 804 comprising optical components arranged therein, and the optical sensor 804 may have been calibrated, including characterizing one or more of the optical components using the radiometric characterization testing described herein prior to being introduced into the wellbore 718. Moreover, prior to being introduced into the wellbore 718, downhole tool 802 including optical sensor 804 may have been optimized by the steps described below with reference to FIG. 8. Optical sensor 804 may be configured to measure optical responses of the formation fluids, and any measurement data generated by downhole tool 802 and its associated optical sensor 804 can be real-time processed for decision-making, or communicated to a surface logging facility 808 for storage, processing, and/or analysis. Logging facility 808 may be provided with electronic equipment 810, including processors for various types of data and signal processing including perform at least some steps in methods consistent with the present disclosure.

Figure 9:
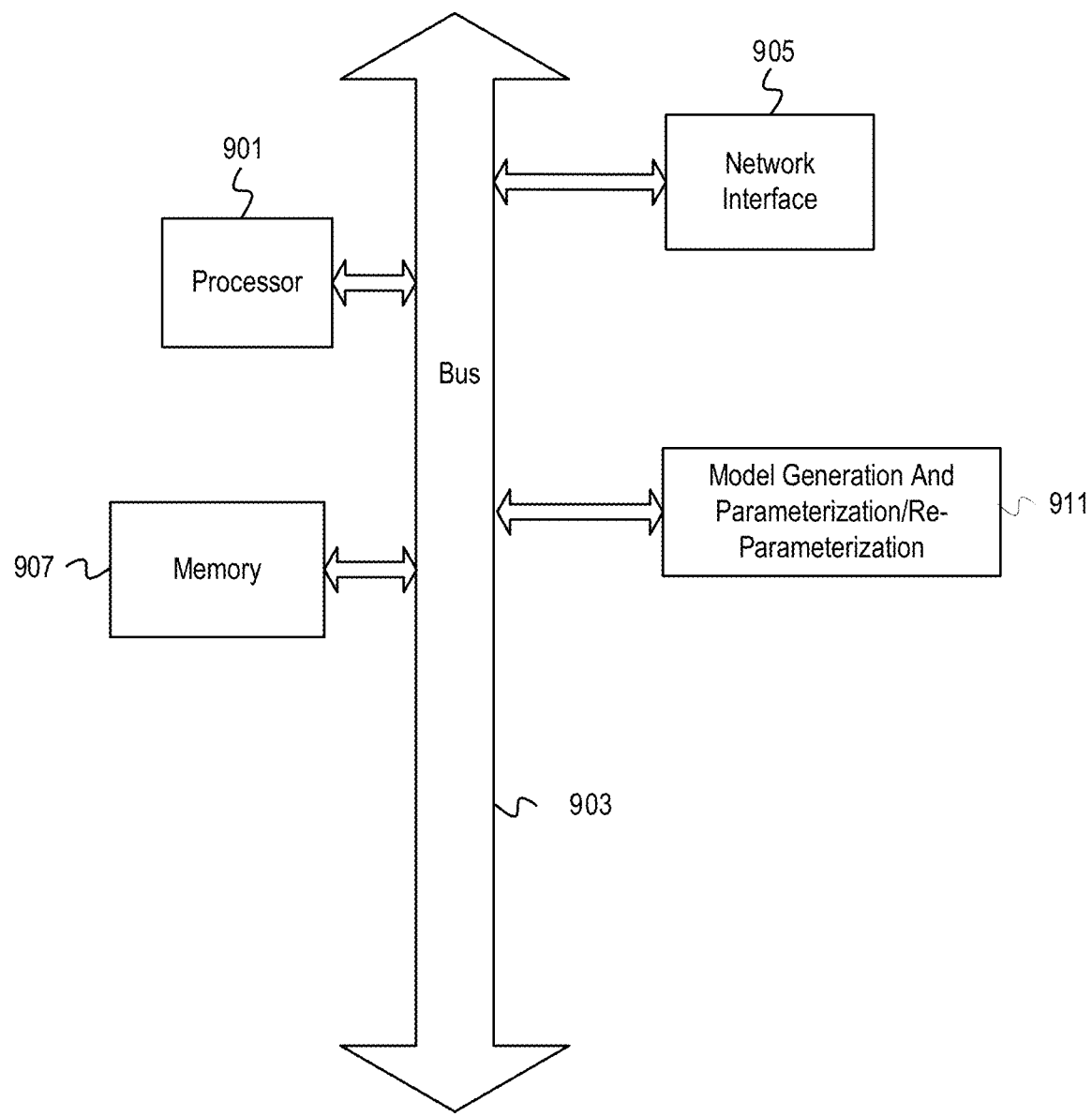
FIG. 9 is a block diagram of an example computer system configured to implement operations and functions described with reference to FIGS. 1-8.

FIG. 9 depicts an example computer system, according to some embodiments. The computer system includes a processor 901 (possibly including multiple processors, multiple cores, multiple nodes, and/or implementing multi-threading, etc.). The computer system includes a memory 907. The memory 907 may be system memory (e.g., one or more of cache, SRAM, DRAM, eDRAM, EEPROM, NRAM, etc.) or any one or more of the above already described possible realizations of machine-readable media. The computer system also includes a bus 903 (e.g., PCI, ISA) and a network interface 905.

The computer system includes a model generation and parameterization system 911, which may be hardware, software, firmware, or a combination thereof. For example, the model generation and parameterization system 911 may comprise instructions executable by the processor 901. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Additional realizations may include fewer or more components not expressly illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

VARIATIONS

While the aspects of the disclosure are described with reference to various implementations, these aspects are illustrative and the scope of the claims is not limited thereto. Plural instances may be provided for components, operations or structures described herein as a single instance. Finally, boundaries between various components, operations and data stores can vary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. The operations may be performed in parallel and/or in a different order. Each block of the flowchart illustrations and/or block diagrams, and combinations of blocks in the flowchart illustrations and/or block diagrams, can be implemented by program code provided to a processor of a general-purpose computer, special purpose computer, or other programmable machine or apparatus.

Aspects of the disclosure may be embodied as a system, method or program code/instructions stored in one or more machine-readable media. Aspects may take the form of hardware, software (including firmware, resident software, micro-code, etc.), or a combination of software and hardware aspects that may all generally be referred to herein as a "circuit," "module" or "system." The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium. Use of the phrase "at least one of" preceding a list with the conjunction "and" should not be treated as an exclusive list and should not be construed as a list of categories with one item from each category, unless specifically stated otherwise.

EXAMPLE EMBODIMENTS

Embodiment 1: A method for optically measuring material properties comprising: radiometrically characterizing an optical sensor based on measured optical responses; generating a model comprising model components of the optical sensor; generating a parameterized model by fitting n variable parameters of the model components using the optical responses; measuring, by the optical sensor, an optical response to a reference material; and generating a re-parameterized model by re-fitting m of the n variable parameters of the model components based, at least in part, on the measured optical response to the reference material, wherein m is less than n. The method may further include measuring, utilizing the optical sensor, an optical response to a material sample; processing, by the re-parameterized model, the optical response to the material sample; and determining properties of the material sample based on the processed optical response to the material sample. Said processing the optical response to the material sample may comprise adjusting the optical response to the material sample based on the re-parameterized model. The m parameters may include at least one of a light source temperature parameter and a light source energy supply parameter. Said re-fitting the m variable parameters may comprise re-fitting the m variable parameters based, at least in part, on pre-determined values for at least one of the n-m of the n variable parameters that are not among the m variable parameters. Said re-fitting the m variable parameters may include refitting the m variable parameters based on one or more pre-determined optical interactive properties of the reference material. Said radiometrically characterizing the optical sensor may comprise: measuring a first set of one or more optical responses of an optical measurement path including one or more optical sensor components; measuring a second set of one or more optical responses of a reconfigured optical measurement path including one or more reference components; and determining parameters of the optical sensor components based on the first set of one or more optical responses and the second set of one or more optical responses. The optical measurement path and the reconfigured optical measurement path may include a light source that generates light, an optical detector, and a transmissive diffuser having a diffusion structure that scatters the light, wherein the transmissive diffuser is positioned between the light source and the optical detector. Said generating the model may comprise generating the model components to represent a light source and optical components that modify light from the light source. Said generating the model components may comprise generating a physical component representation or a data construct representation of optical components within the optical sensor. Said generating the parameterized model may include determining p parameters of the model components having lower variability in terms of rate of variation or range of variation than the n variable parameters, and fixing a value of at least one of the p parameters based on an average of the optical responses.

Embodiment 2: A system for optically measuring material properties comprising: a radiometry system configured to radiometrically characterize an optical sensor based on measured optical responses; processing means configured to generate a model comprising model components of the optical sensor; processing means configured to generate a parameterized model by fitting n variable parameters of the model components using the optical responses; the optical sensor configured to measure an optical response to a reference material; and processing means configured to generate a re-parameterized model by re-fitting m of the n variable parameters of the model components based, at least in part, on the measured optical response to the reference material, wherein m is less than n. The system may further comprise: the optical sensor configured to measure an optical response to a material sample; the re-parameterized model configured to process the optical response to the material sample; and processing means configured to determine properties of the material sample based on the processed optical response to the material sample. Said processing the optical response to the material sample may comprise adjusting the optical response to the material sample based on the re-parameterized model. The m parameters may include at least one of a light source temperature parameter and a light source energy supply parameter. Said re-fitting the m variable parameters may comprise re-fitting the m variable parameters based, at least in part, on pre-determined values for at least one of the n-m of the n variable parameters that are not among the m variable parameters. Said re-fitting the m variable parameters may include refitting the m variable parameters based on one or more pre-determined optical interactive properties of the reference material. Said radiometrically characterizing the optical sensor may comprise: measuring a first set of one or more optical responses of an optical measurement path including one or more optical sensor components; measuring a second set of one or more optical responses of a reconfigured optical measurement path including one or more reference components; and determining parameters of the optical sensor components based on the first set of one or more optical responses and the second set of one or more optical responses. The optical measurement path and the reconfigured optical measurement path may include a light source that generates light, an optical detector, and a transmissive diffuser having a diffusion structure that scatters the light, wherein the transmissive diffuser is positioned between the light source and the optical detector. Said generating the model may comprise generating the model components to represent a light source and optical components that modify light from the light source, and wherein said generating the model components comprises generating a physical component representation or a data construct representation of optical components within the optical sensor.

What is claimed is:

1. A method, performed by an optical response system, for optically measuring material properties, comprising:
   determining, for the optical response system, a configuration for an optical measurement path including a source of light, a transmissive diffuser having a diffusion structure that scatters the light, and an optical sensor;
   radiometrically characterizing the optical sensor of the optical measurement path based on measured optical responses and the configuration;
   generating a first model comprising model components of the optical sensor;
   generating a parameterized model by fitting n variable parameters of the model components using the optical responses;
   measuring, by the optical sensor, an optical response to a reference material; and
   generating a re-parameterized model by re-fitting m of the n variable parameters of the model components based, at least in part, on the measured optical response to the reference material, wherein m is less than n; and
   utilizing the re-parameterized model to determine properties of a second material.

2. The method of claim 1, further comprising:
   measuring, utilizing the optical sensor, an optical response to a material sample;
   processing, by the re-parameterized model, the optical response to the material sample; and
   determining properties of the material sample based on the processed optical response to the material sample.

3. The method of claim 2, wherein said processing the optical response to the material sample comprises adjusting the optical response to the material sample based on the re-parameterized model.

4. The method of claim 1, wherein the m parameters include at least one of a light source temperature parameter and a light source energy supply parameter.

5. The method of claim 1, wherein said re-fitting the m variable parameters comprises re-fitting the m variable parameters based, at least in part, on pre-determined values for at least one of the n-m of the n variable parameters that are not among the m variable parameters.

6. The method of claim 1, wherein said re-fitting the m variable parameters includes refitting the m variable parameters based on one or more pre-determined optical interactive properties of the reference material.

7. The method of claim 1, wherein said radiometrically characterizing the optical sensor comprises:
   measuring a first set of one or more optical responses of the optical measurement path including one or more optical sensor components;
   measuring a second set of one or more optical responses of a reconfigured optical measurement path including one or more reference components; and
   determining parameters of the optical sensor components based on the first set of one or more optical responses and the second set of one or more optical responses.

8. The method of claim 7, wherein the transmissive diffuser is positioned between the source of light and the optical detector.

9. The method of claim 1, wherein said generating the first model comprises generating the model components to represent the source of light and optical components that modify the light.

10. The method of claim 9, wherein said generating the model components comprises generating a physical component representation or a data construct representation of optical components within the optical sensor.

11. The method of claim 1, wherein said generating the parameterized model includes:
determining p parameters of the model components having lower variability in terms of rate of variation or range of variation than the n variable parameters; and
fixing a value of at least one of the p parameters based on an average of the optical responses.

12. A system for optically measuring material properties comprising:
processing means configured to determine, for the first response system, a configuration for an optical measurement path including a source of light, a transmissive diffuser having a diffusion structure that scatters the light, and an optical sensor;
a radiometry system configured to radiometrically characterize the optical sensor of the optical measurement path based on measured optical responses and the configuration;
processing means configured to generate a first model comprising model components of the optical sensor;
processing means configured to generate a parameterized model by fitting n variable parameters of the model components using the optical responses;
the optical sensor configured to measure an optical response to a reference material; and
processing means configured to generate a re-parameterized model by re-fitting m of the n variable parameters of the model components based, at least in part, on the measured optical response to the reference material, wherein m is less than n; and
processing means configured to utilize, by the optical sensor response system, the re-parameterized model to determine properties of a second material.

13. The system of claim 12, further comprising:
The optical sensor configured to measure an optical response to a material sample;
the re-parameterized model configured to process the optical response to the material sample; and
processing means configured to determine properties of the material sample based on the processed optical response to the material sample.

14. The system of claim 13, wherein said processing the optical response to the material sample comprises adjusting the optical response to the material sample based on the re-parameterized model.

15. The system of claim 12, wherein the m parameters include at least one of a light source temperature parameter and a light source energy supply parameter.

16. The system of claim 12, wherein said re-fitting the m variable parameters comprises re-fitting the m variable parameters based, at least in part, on pre-determined values for at least one of the n-m of the n variable parameters that are not among the m variable parameters.

17. The system of claim 12, wherein said re-fitting the m variable parameters includes refitting the m variable parameters based on one or more pre-determined optical interactive properties of the reference material.

18. The system of claim 12, wherein said radiometrically characterizing the optical sensor comprises:
measuring a first set of one or more optical responses of the optical measurement path including one or more optical sensor components;
measuring a second set of one or more optical responses of a reconfigured optical measurement path including one or more reference components; and
determining parameters of the optical sensor components based on the first set of one or more optical responses and the second set of one or more optical responses.

19. The system of claim 18, wherein the transmissive diffuser is positioned between the source of light and the optical detector.

20. The system of claim 12, wherein said generating the first model comprises generating the model components to represent the source of light and optical components that modify the light, and wherein said generating the model components comprises generating a physical component representation or a data construct representation of optical components within the optical sensor.

* * * * *